United States Patent [19]
Swift et al.

[11] Patent Number: 6,053,673
[45] Date of Patent: Apr. 25, 2000

[54] CORNER ROUNDING MILLING AND INSERT THEREFOR

[76] Inventors: Steven M. Swift, 17822 Driftwood Dr. East, Sumner, Wash. 98390; Larry R. Swift, 13215 6th Ave. South, Seattle, Wash. 98168; Moses H. Sahagian, 16808 47th St. Ct. East, Sumner, Wash. 98390

[21] Appl. No.: 09/265,526

[22] Filed: Mar. 8, 1999

[51] Int. Cl.$^7$ .................................................. B23C 5/12
[52] U.S. Cl. ............................... 407/42; 407/62; 407/64; 407/65
[58] Field of Search ................... 407/33, 34, 35, 407/40, 42, 47, 48, 50, 62, 64, 65

[56] References Cited

U.S. PATENT DOCUMENTS

| | | | |
|---|---|---|---|
| 4,252,480 | 2/1981 | Mizumo et al. | 408/223 |
| 4,411,564 | 10/1983 | Johnson | 407/34 |
| 4,614,463 | 9/1986 | Hughes | 407/49 |
| 4,669,923 | 6/1987 | McKinney | 407/34 |
| 5,063,980 | 11/1991 | Schultz | 83/837 |
| 5,123,786 | 6/1992 | Yates et al. | 407/38 |
| 5,586,843 | 12/1996 | Minicozzi | 407/42 |
| 5,741,095 | 4/1998 | Charren et al. | 407/42 |
| 5,893,683 | 4/1999 | Johnson | 407/42 |

Primary Examiner—Henry W. H. Tsai
Attorney, Agent, or Firm—Roy E. Mattern Jr.

[57] ABSTRACT

An improved corner-rounding milling cutter preformed indexable and insert therefor. A plurality of the inserts staggered around the axis of rotation of the cutter body cut segments of a composite arcuate cutting profile of uniform radius, together forming the complete arcuate cutting profile. The inserts are interchangeable between any of the positions provided on the milling cutter.

20 Claims, 7 Drawing Sheets

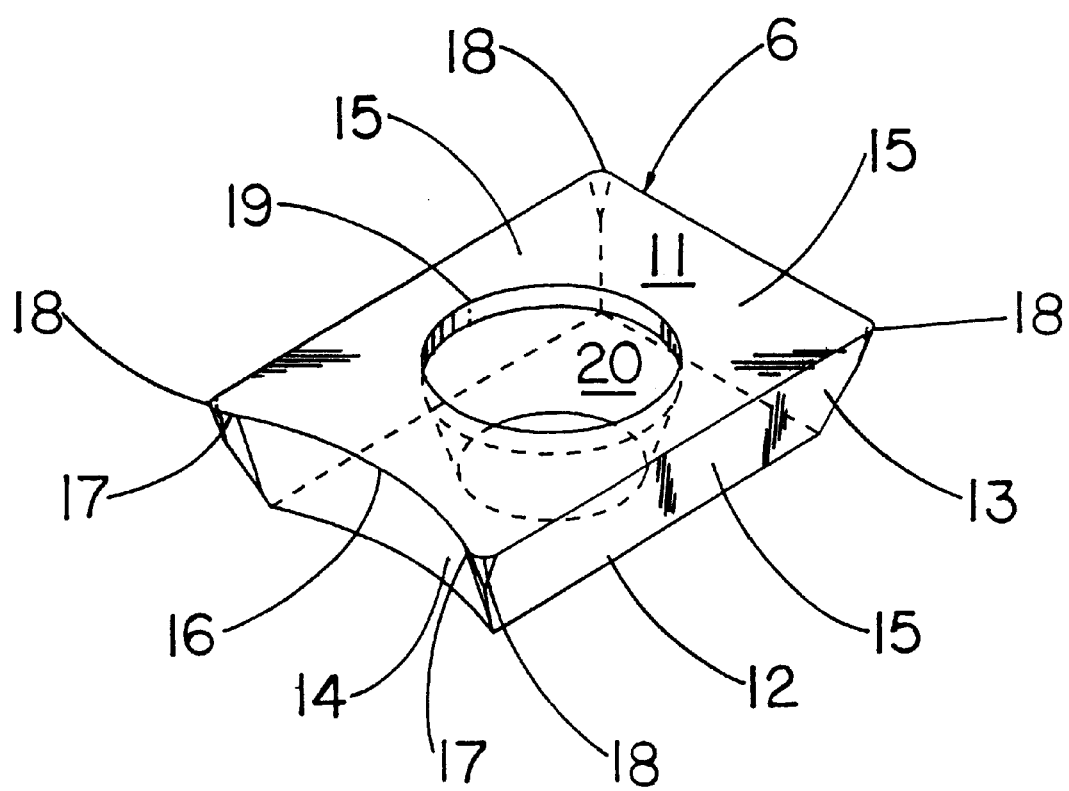

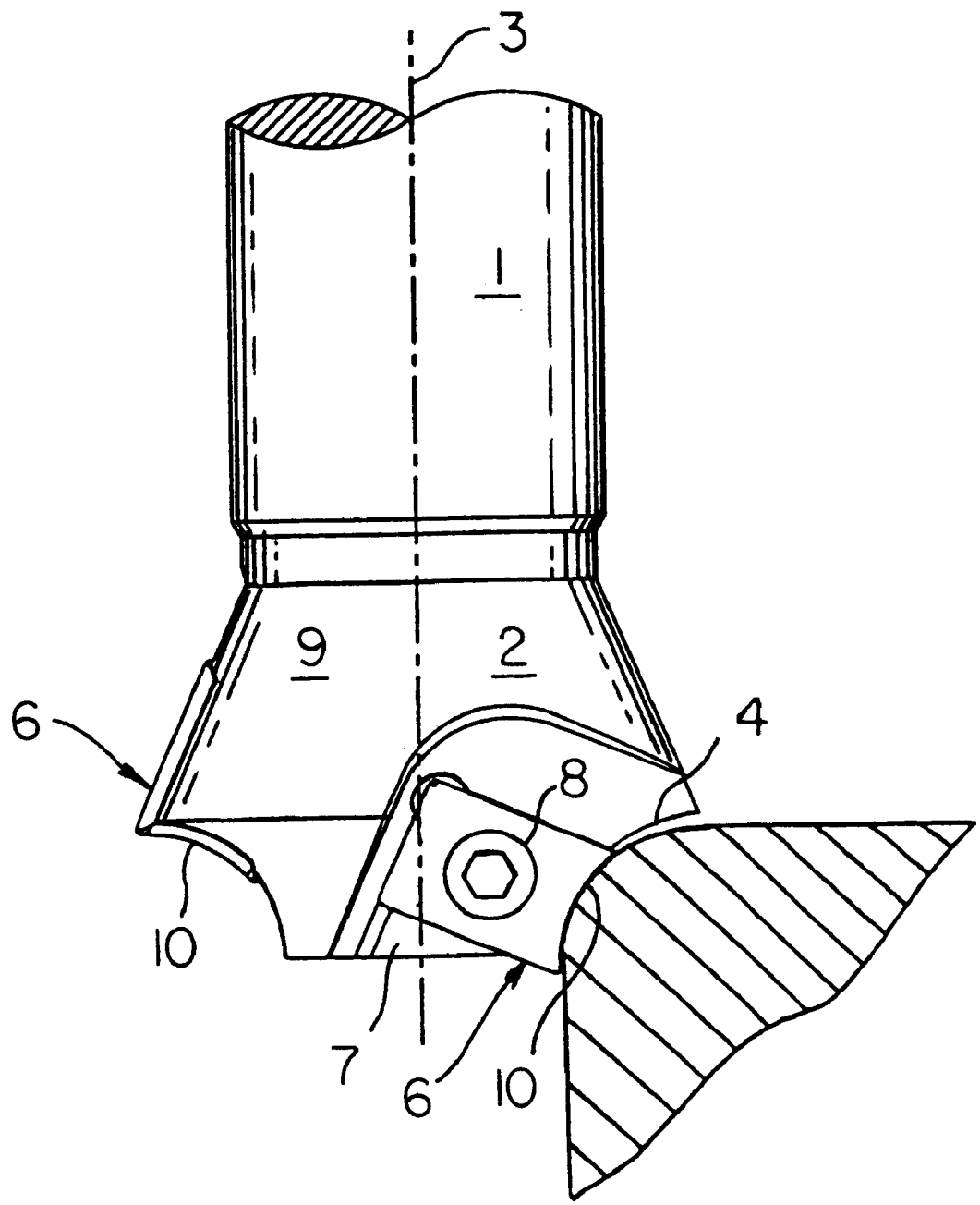

CORNER ROUNDING MILLING AND INSERT THEREFOR

BACKGROUND OF THE INVENTION

1. Field of the Invention.

The present invention relates to an improved cutting tool and inserts for use in the cutting tool.

The present invention further relates to improved concave corner-rounding end mills which use inserted cutting teeth to form surfaces of convex arcuate profile of substantially uniform radius of curvature.

2. Description of the Related Art.

It is known to cut a convex arcuate profile shape with a milling cutter that carries a plurality of cutting inserts. One such embodiment of this process is commonly referred to as 'corner-rounding' and is performed on a variety of materials. In reference to this process, U.S. Pat. No. 4,614,463 discloses a milling cutter using a plurality of removable cutting blades clamped to the cutter body in a self-locating manner, these blades having identical cutting edges containing an arcuate section of concave nature and positioned about the axis of rotation so that each cuts the same convex arcuate profile. Such a design allows for removal of the cutting blades for re-sharpening or replacement, but design of specific embodiments of the tool with respect to cutting profile size are dependent on the size of the cutting blade available. Therefore, two such embodiments with comparatively differing cutting profile sizes may require cutting blades of different size, forcing the use of two separate insert sizes to accommodate the different cutting profiles.

In reference to a related process, U.S. Pat. No. 5,123,786 discloses a milling cutter using a plurality of removable cutting inserts clamped to the cutter body, these inserts staggered about the axis of rotation and cutting profile so that each cuts a portion of a roughly concave arcuate profile shape. The inserts are removable but must be sharpened while clamped in the cutter body due to the compound cutting profile required for the intended applications. Design of specific embodiments of the tool with respect to cutting profile are not limited by the size of any one insert cutting edge, only by quantity, as each insert forms only a portion of the cutting profile. Therefore, two such embodiments with comparatively differing cutting profile sizes may use the same size cutting insert in different quantities, allowing the use of a single insert size which can accommodate varying cutting profiles.

SUMMARY OF THE INVENTION

The present invention is an improved cutting tool and insert therefor for producing a convex arcuate profile shape by milling. The preferred embodiment of the tool is a milling cutter comprising a rotatable body with cutting head and means for attaching to a milling machine, preferably a cylindrical shank. The cutting head includes provisions for mounting receipt of at least two cutting inserts offset radially about the axis of rotation of the tool. The inserts present a concave arcuate cutting edge with radius of curvature approximately equal to, and of length less than that of, the intended cutting profile, and are staggered in their seatings about the center of the radius of curvature of the cutting profile so as to have partially overlapping paths of rotation. Each insert cuts a segment of the profile, and together the inserts jointly define a continuous concave arcuate cutting profile for production of a relative convex profile shape. Furthermore, each insert is identical in size and shape and relies on placement in the cutter body to determine its individual cutting position. Preferably, each insert has first and second major polygonal faces connected by flank surfaces. The first major face is preferably planar and parallel to the second, but may consist of generally concave surfaces to enhance cutting rake. The cutting edge is formed by the intersection of the first major face and at least one flank surface, these involved flank surfaces share the profile of the cutting edge so as to provide clearance when cutting. The second major face is functionally planar and intersects each flank surface at an obtuse angle so as to provide clearance for the cutting edge.

The present invention has features which, when applied together, provide several advantages over prior inventions. By dividing the cutting profile into multiple staggered cutting edges, instantaneous contact between the cutting tool and the workpiece is reduced to a segment of the entire cutting profile. This segmented cutting reduces cutting stress, yielding longer tool life, quieter and more accurate cutting, and higher quality surface finishes. The use of multiple inserts in positions staggered about the cutting profile allows for the addition of adjusted insert positions with respect to the cutting edge to provide improved cutting rake, yielding further reduction in cutting stress. Furthermore, the inserts have partially overlapping paths of rotation, creating overlapping segments of the cutting profile near the ends of each cutting edge. This overlap reduces the cutting stress at these points where the inserts may be structurally weaker due to size and shape. The application of inserts in such an aforementioned manner also allows a single size of cutting insert to be used in a variety of embodiments of the present invention with differing profile radii with only minor changes to the insert cutting edge, requiring the manufacture of only a single insert size for virtually any such embodiment. Therefore such an embodiment of relatively small profile radius may have the same size insert as an embodiment of far larger profile radius, with only a minor difference in cutting edge profile and an increase in quantity of cutting insert positions roughly proportional to the increase in profile radius size. Design of embodiments of the present invention which produce a convex arcuate profile shape with included angle of up to and including 180 degrees and of virtually unlimited profile radius size are possible using varying pluralities of a single insert size, with differences contained only within the cutting edge profile. Finally, all inserts used in a specific embodiment of the current invention are identical, therefore interchangeable between any positions on the cutter body, and can be manufactured separate from the cutter body, allowing for maximum time and cost efficiency in the manufacture and replacement of the cutting inserts.

BRIEF DESCRIPTION OF THE DRAWINGS

FIG. 6 is a top perspective view thereof.

FIG. 7 is a front elevation view of the cutting end of the cutting tool with respect to a cross-section of the concave arcuate cutting profile of the cutting inserts and the convex arcuate cutting profile of a surface of a product cut or formed by the cutting tool.

DESCRIPTION OF THE PREFERRED EMBODIMENT

Figure 1:
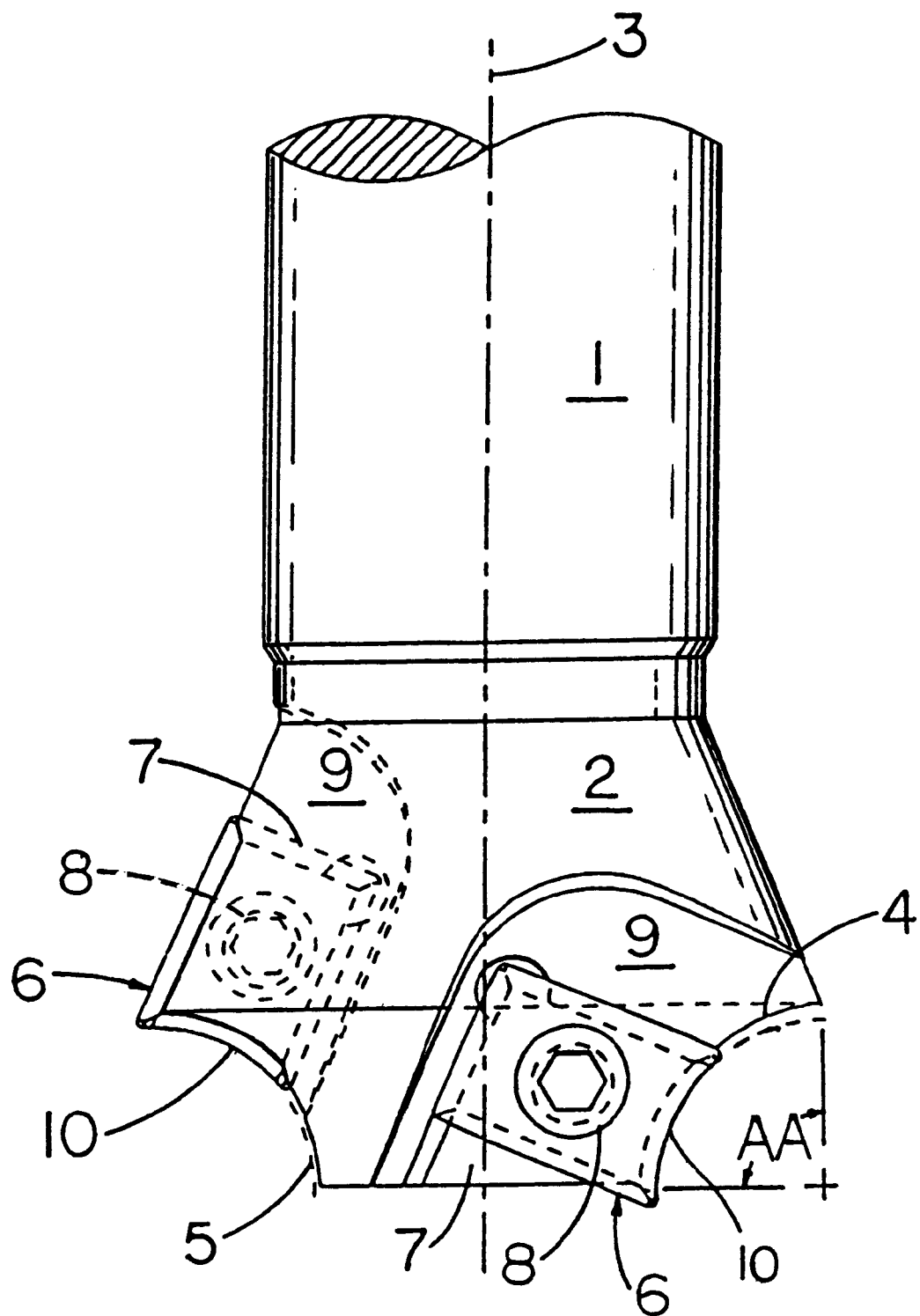
FIG. 1 is a front elevation view of the cutting end of the cutting tool of the present invention with inserts therefor seated in cutting positions thereon, hidden features shown for clarity.
Figure 2:
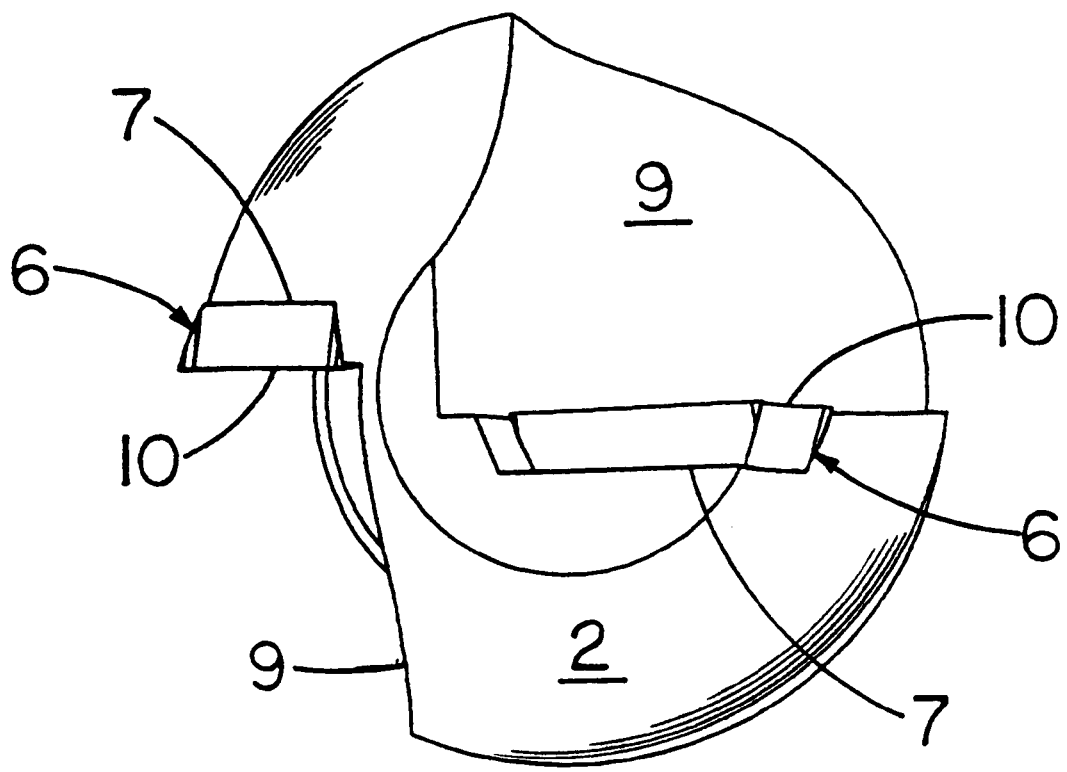
FIG. 2 is a plan view thereof.
Figure 3:
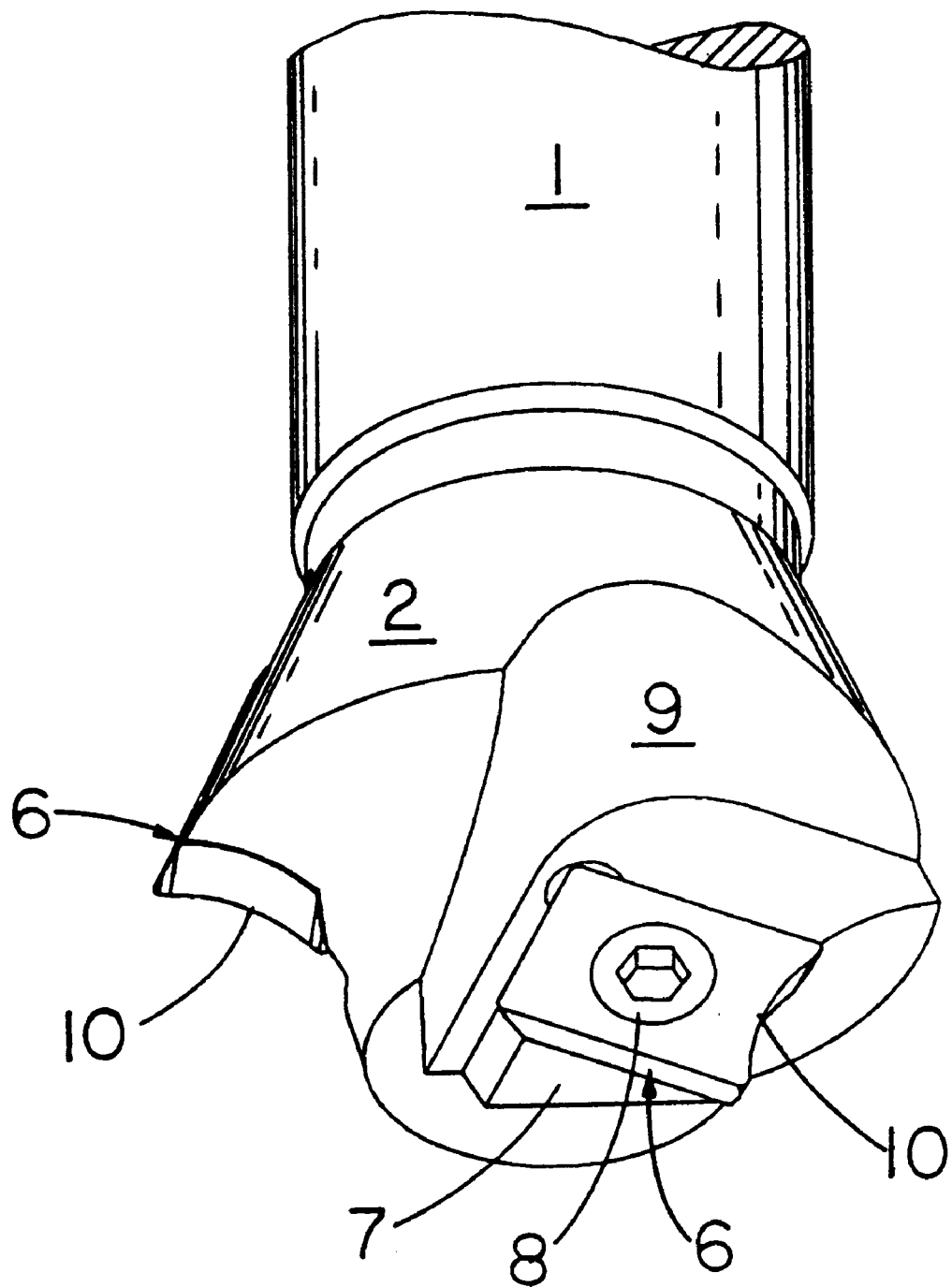
FIG. 3 is a perspective view of the cutting tool and inserts of the present invention.
Figure 4:
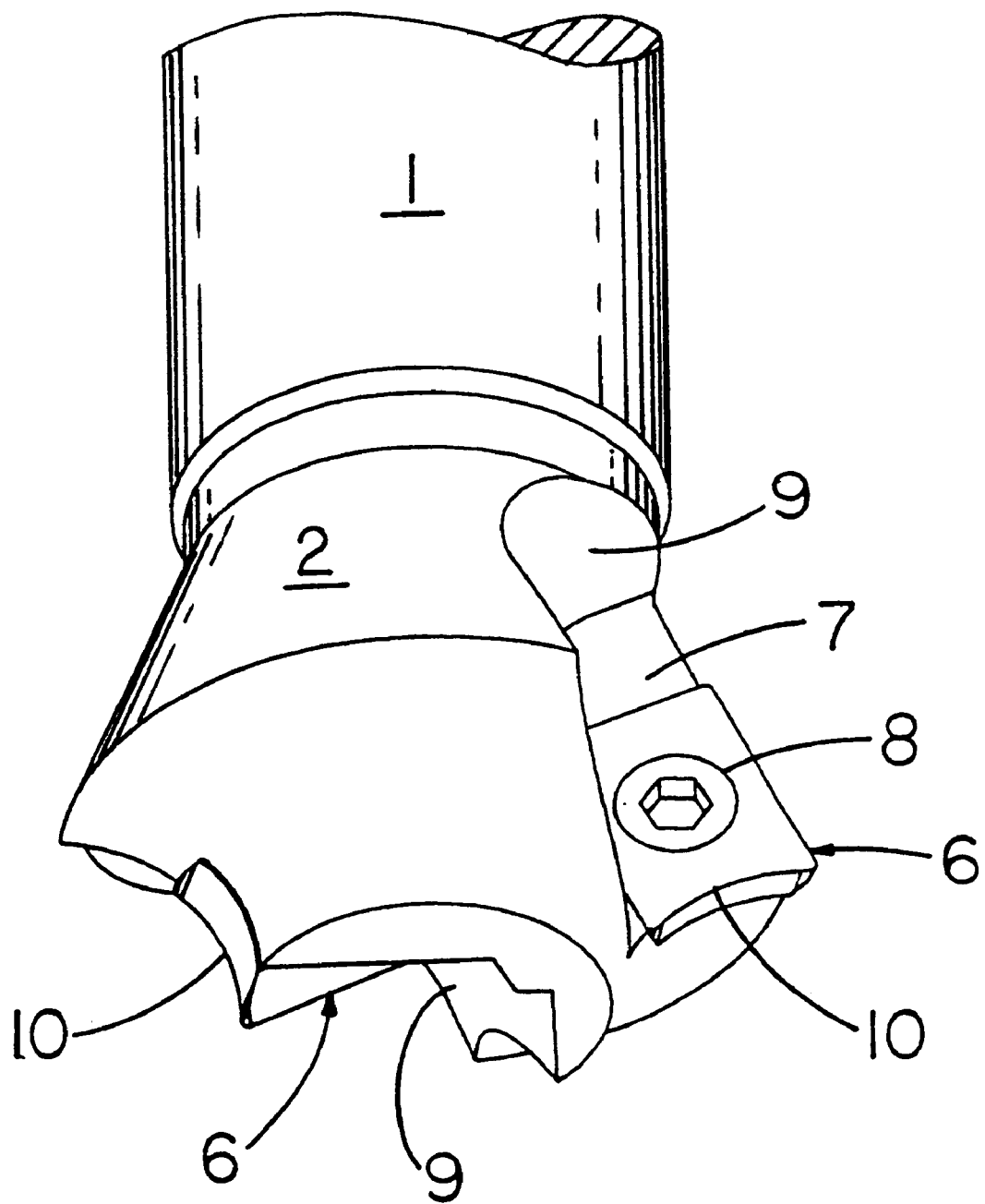
FIG. 4 is a perspective view of the cutting tool and inserts of the present invention viewed opposite FIG. 3 about the axis of rotation.

Referring to FIGS. 1–4, the cutting tool set forth by the present invention is comprised of a cutter body on which are mounted cutting inserts by mechanical mounting means. The cutter body consists of a cylindrical shank 1 and a formed cutting end 2 integral to one end of the shank. The tool is rotated about a longitudinal axis 3 to cut a convex arcuate shape of substantially uniform radius of curvature.

The formed cutting end has profile 4 similar to that of the arcuate cutting profile 5, with appropriate reduction in dimensions to produce clearance from the cutting profile. The cutting profile 5 is concave with respect to the profile of the cutting tool and convex with respect to the profile on the cut product as seen in FIG. 7, and forms an arcuate angle AA of approximately 90 degrees. The formed cutting end contains a minimum of two indexable cutting inserts 6 seated in mounting cavities 7 and secured by threaded screws 8 which pass through the inserts and anchor in threaded cavities in the cutter body. The mounting cavities are preferably similar in shape to the inserts and the threaded cavities are preferably normal to the mounting cavity floor. The threaded screws are preferably of appropriate dimension so as to sit flush with the major face of the insert. Although this system is preferred, it is understood that it can be replaced with other suitable means of mounting and clamping mechanisms.

The position of the insert mounting cavities 7 in the formed cutting end is such that (A) the insert cutting edge 10 protrudes from the profile of the cutter body 4, so as to provide clearance between the cutter body and the cutting profile 5 and that (B) only one cutting edge 10 of only one insert 6 contacts the work at one time. Chip gullets 9 intersect each mounting cavity to provide clearance for removed material when cutting. Further, the insert mounting cavities are staggered about the center of the cutting profile radius so that the cutting edges 10 of the seated inserts have partially overlapping paths when the tool is rotated, generating a concave arcuate cutting profile 5 of substantially constant radius from the cutting profile segments defined by the rotation of each cutting edge. Finally, the insert mounting cavities are staggered about the axis of rotation at substantially regular intervals such that the cutting edge 10 of only one insert contacts the work at any time and are preferably positioned with cutting face rake so that an obtuse angle is formed between the first major face and the material surface directly in its path.

Figure 5:
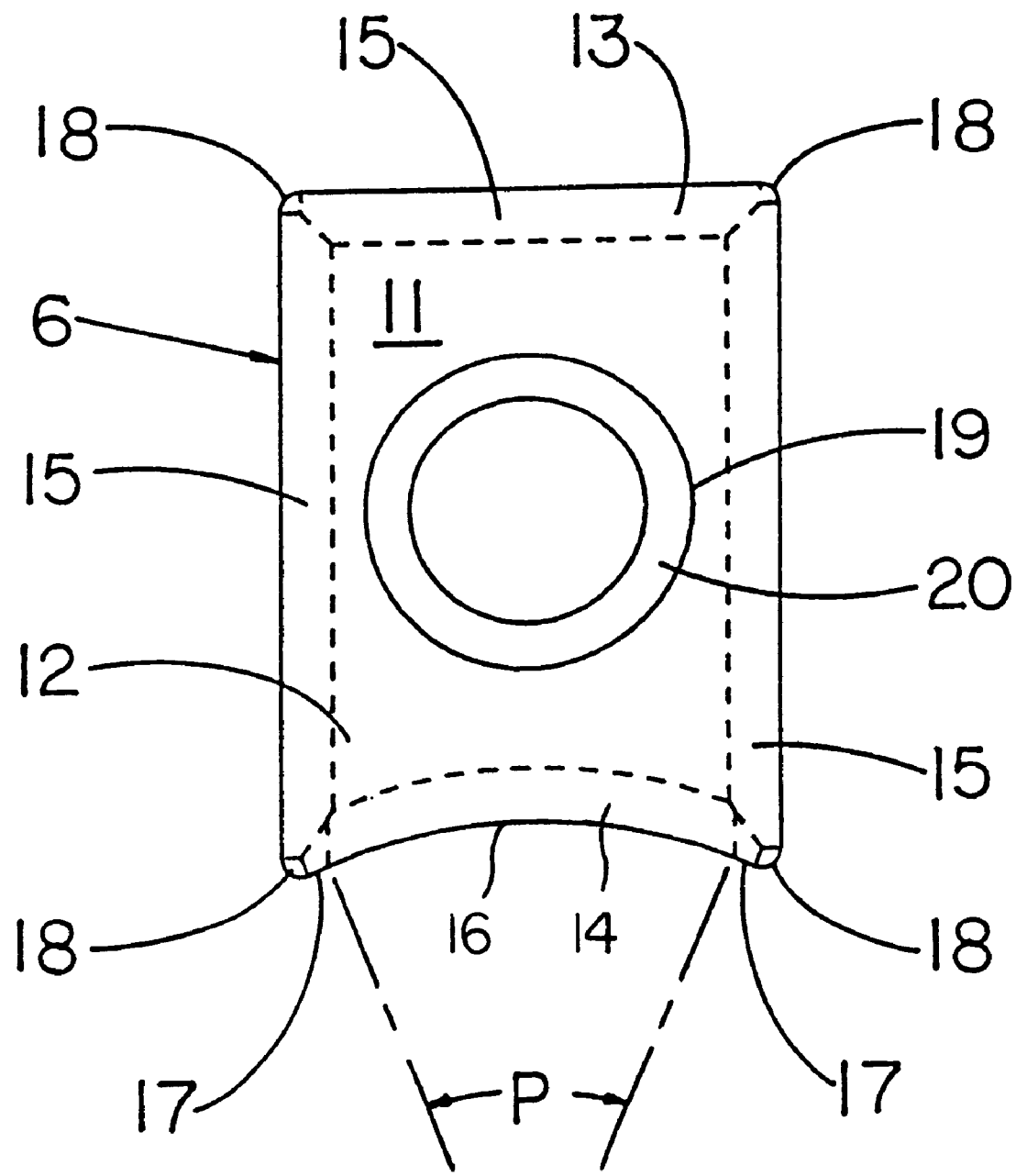
FIG. 5 is a plan view of the cutting insert of the present invention.

Referring to FIGS. 5 and 6, the preferred insert according to the present invention is of a substantially rectangular shape. At least one edge of the rectangular insert contains a concave arcuate cutting edge 10 of angle P of no more than 90 degrees. The substantially rectangular insert is comprised of first major face 11 and second major face 12 oriented opposite each other and preferably planar. These major faces are separated by sidewall 13 which defines the thickness of the insert and is comprised of flank faces 14 and 15. The area of each flank face 14, 15, individually being substantially less than the area of each major face 11, 12, individually. The cutting edge is defined by the intersection of the first major face and one or more flank faces 15, and is comprised of a concave arcuate section 16 bounded by tangential sections 17 of relatively linear nature. The concave arcuate section 16 is of radius substantially equal to that of the convex arcuate profile shape to be cut and defines a segment of the concave arcuate cutting profile 5; the linear tangential sections 17 of the insert cutting edge provide smooth blend between the overlapping paths of rotation of the inserts. The flank face 14 relative to the cutting edge 10 is contoured similar to the cutting edge as opposed to the other flank faces 15 which are preferably planar. The angle between the second major face 12 and any of the flank faces is obtuse to provide clearance behind the cutting edge 10 and uniformity along the sidewall 13 for mounting. It is preferred that the corners 18 of the first major face have profiles that are arcuate in nature so as to increase the rigidity of those regions of the insert. The insert shown in the drawings is of substantially rectangular shape, but any polygonal shape can be used, provided it can accommodate a cutting edge of sufficient dimensions.

The insert preferably contains a clamp hole 19 substantially close to the center of the first major face and beveled at one end thereof to form a tapered surface 20 for contact with the clamping screw. This feature is a provision for the clamping system described previously and may be replaced with any suitable alternative.

The cutting insert according to the present invention may be augmented with additional features relative to its applicable geometry. Such features may include, but are not limited to chip breaker formations, positive or negative face lands, staggered or serrated cutting edge, or any other applied means. The symmetrical nature of the insert is a preferred condition for ease of mounting but is not necessary according to the present invention.

Although this embodiment of the present invention generates an arcuate cutting profile 5 with included angle of approximately 90 degrees (noted by angle AA in FIG. 1), it is possible to generate a cutting profile 5 with virtually any relative included angle of up to and including 180 degrees by the manipulation of insert size, quantity, and placement in creation of an embodiment of the present invention. Additionally, a cutting profile of virtually any radius can be generated by the manipulation of such aforementioned features, while still maintaining all previously mentioned benefits. Finally, any rake angle may be applied to the seated position of each insert, bounded only by the clearance yielded by the flank faces and dictated by known machining practice to produce adjusted cutting performance.

Descriptions of specific embodiments of the present invention set forth previously are for the sake of example only. The scope of the present invention encompasses many variations apparent to those of ordinary skill in the art, as defined in the claims hereafter.

We claim:

1. An indexable corner-rounding cutting tool comprising a rotatable body with means for attachment to a milling apparatus terminating in a formed cutting end and including at least two mounting cavities for receipt of preformed indexable cutting inserts, at least two cutting inserts mounted on said body, each of which cutting inserts having substantially same shape and being interchangeable with other inserts in other mounting cavities, and means for mounting the indexable cutting insert to the mounting cavity, the indexable cutting inserts comprised of first and second major faces and peripheral flank faces, said second major face being planar and intersecting each flank face forming an included angle between the two of no less than 90 degrees, the intersection of the first major face and one or more flank faces forming the cutting edge, said cutting edge being arcuate and concave in nature and of included arc angle of no more than 90 degrees, said inserts being mounted in position on the cutter body such that when rotated about an axis relative to the means of mounting to a milling apparatus the said cutting edges of each insert have partially overlapping paths of rotation, such that the said cutting edges of each insert form a continuous concave arcuate cutting profile of included angle of no more than 180 degrees, and such that the cutting edge of only one insert contacts the work at a time.

2. The cutting tool of claim 1, wherein the formed cutting edge has profile similar in part to that of the cutting profile.

3. The cutting tool of claim 1, wherein each insert mounting cavity intersects a chip gullet such that the chips formed by the arcuate cutting edges are directed by the first major face of the insert into the chip gullet.

4. The cutting tool of claim 3, wherein multiple mounting cavities may intersect and utilize one chip gullet.

5. The cutting tool of claim 1, wherein an insert specific to the cutting tool has at least one arcuate cutting edge bounded by minor linear tangential cutting edges.

6. The cutting tool of claim 1, wherein an insert specific to the cutting tool has major faces which are rectangular in shape disregarding the cutting edge.

7. The cutting tool of claim 1, wherein all said cutting inserts are identical.

8. The cutting tool of claim 7, wherein the arcuate cutting edges of each said insert are formed prior to mounting in the mounting cavities on the rotatable body.

9. The cutting tool of claim 1, wherein the inserts specific for the cutting tool are symmetrical about an axis through the center of curvature of the arcuate cutting edge and the center of the insert.

10. The cutting tool of claim 1, wherein the second major face is seated on a planar floor of the mounting cavity.

11. The cutting tool of claim 10, wherein at least one of the flank surfaces contacts a sidewall of the mounting cavity.

12. The cutting tool of claim 11, wherein each said planar floor is normally intersected by a threaded cavity for receipt of a threaded clamp screw.

13. The cutting tool of claim 12, wherein the inserts are secured by means of threaded clamp screw passing through an aperture in the insert and anchoring in the cutter body.

14. The cutting tool of claim 1, wherein the flank face forming the cutting edge is generally parallel to the arcuate cutting profile.

15. The cutting tool of claim 14, wherein the means for mounting the cutting insert to the mounting cavity pass through the first and second major faces.

16. The cutting tool of claim 15, where the flank face forming the cutting edge is of substantially less area than the first major face.

17. A cutting tool comprising a rotatable body with means for attachment to a milling apparatus terminating in a formed cutting end and including at least two mounting cavities for receipt of indexable cutting inserts, at least two cutting inserts mounted on said body, each of which cutting inserts having substantially the same shape and being interchangeable with other inserts in other mounting cavities, and means for mounting the indexable cutting insert to the mounting cavity, the indexable cutting inserts being comprised of first and second major faces and peripheral flank faces, the intersection of the first major face and one or more flank faces forming the cutting edge, said cutting edge being arcuate and concave in nature, said cutting inserts being mounted in position on the cutter body such that when rotated about an axis relative to the means of mounting to a miling apparatus the said cutting edges of each insert have partially overlapping paths of rotation, such that the said cutting edges of each insert form a continuous concave arcuate cutting profile, and such that the cutting edge of only one insert contacts the work at a time.

18. The cutting tool of claim 17, wherein the cutting inserts are substantially identical and the arcuate cutting edges of each insert are formed prior to mounting in the mounting cavities on the rotatable body.

19. The cutting tool of claim 18, wherein the means for mounting the cutting insert to the rotatable body passes through the first and second major faces and the cutting edge is formed by a flank face, the surface of which flank face is generally parallel to the arcuate cutting profile.

20. The cutting tool of claim 19, wherein the flank face forming the cutting edge is of substantially less area than the first major face.

* * * * *